(12) United States Patent
Hill et al.

(10) Patent No.: US 8,798,400 B2
(45) Date of Patent: *Aug. 5, 2014

(54) USING NEAR-DUPLICATE VIDEO FRAMES TO ANALYZE, CLASSIFY, TRACK, AND VISUALIZE EVOLUTION AND FITNESS OF VIDEOS

(75) Inventors: Matthew L. Hill, Yonkers, NY (US);
John R. Kender, Leonia, NJ (US);
Apostol I. Natsev, Harrison, NY (US);
John R. Smith, New York, NY (US);
Lexing Xie, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 498 days.

This patent is subject to a terminal disclaimer.

(21) Appl. No.: 12/909,094

(22) Filed: Oct. 21, 2010

(65) Prior Publication Data

US 2012/0099785 A1 Apr. 26, 2012

(51) Int. Cl.
*G06K 9/54* (2006.01)
*G06K 9/34* (2006.01)
*G06K 9/68* (2006.01)

(52) U.S. Cl.
USPC ............... 382/305; 382/173; 382/218

(58) Field of Classification Search
CPC .......... G06K 9/00711; G06K 9/00718; G06K 9/00758; G06F 17/30843; G06F 17/30781
USPC .................. 382/305, 306, 219, 173
See application file for complete search history.

(56) References Cited

U.S. PATENT DOCUMENTS

| | | | |
|---|---|---|---|
| 7,212,666 B2 * | 5/2007 | Zhang et al. ............... | 382/162 |
| 2007/0043761 A1 | 2/2007 | Chim et al. | |
| 2008/0159383 A1 * | 7/2008 | Kukreja et al. .......... | 375/240.01 |
| 2008/0178302 A1 | 7/2008 | Brock et al. | |
| 2008/0215607 A1 | 9/2008 | Kaushansky et al. | |
| 2008/0240490 A1 | 10/2008 | Finkelstein et al. | |
| 2009/0028517 A1 | 1/2009 | Shen et al. | |
| 2009/0092375 A1 | 4/2009 | Berry et al. | |
| 2009/0154806 A1 | 6/2009 | Chang et al. | |
| 2010/0011425 A1 | 1/2010 | Eyal | |
| 2010/0070485 A1 | 3/2010 | Parsons et al. | |
| 2010/0104184 A1 | 4/2010 | Bronstein et al. | |
| 2011/0222787 A1 * | 9/2011 | Thiemert et al. ............ | 382/225 |

FOREIGN PATENT DOCUMENTS

| | | |
|---|---|---|
| WO | WO2010011991 A2 | 1/2010 |
| WO | WO2010015422 A1 | 2/2010 |

OTHER PUBLICATIONS

Jiang, Yu-Gang, et al, Ontology-Based Visual Word Matching for Near-Duplicate Retrieval, Jun. 2008, 2008 IEEE International Conference on Multimedia and Expo, pp. 1-4.*

Map of 1900, United States, 2006, Florida Center for Instructional Technology (http://etc.usf.edu/maps/pages/7400/7493/7493z.htm), pp. 1-2.*

(Continued)

*Primary Examiner* — Uptal Shah
(74) *Attorney, Agent, or Firm* — Tutunjian & Bitetto, P.C.; Anne V. Dougherty

(57) ABSTRACT

A system and method for analyzing video include segmenting video stored in computer readable storage media into keyframes. Near-duplicate keyframes are represented as a sequence of indices. The near-duplicate keyframes are rendered in a graphical representation to determine relationships between video content.

20 Claims, 7 Drawing Sheets

(56) References Cited

OTHER PUBLICATIONS

Montagnuolo, Maurizio, et al, Automatic Genre Classification of TV Programmes Using Gaussian Mixture Models and Neural Networks, Sep. 2007, 18th International Workshop on Database and Expert Systems Applications, pp. 1-5.*

Wang, Tao, et al, Video Summarization by Redundancy Removing and Content Ranking, Sep. 2007, Proceedings of the 15th International Conference on Multimedia, pp. 1-4.*

Yeh, Mei-Chen, et al, Video Copy Detection by Fast Sequence Matching, Jul. 2009, Proceedings of the ACM International Conference on Image and Video Retrieval, pp. 1-7.*

Benevenuto, F., et al. "Understanding Video Interactions in Youtube" Proceedings of the 16th International Conference on Multimedia 2008. Oct. 2008. (4 pages).

Cesar, P., et al. "Enhancing Social Sharing of Videos: Fragment, Annotate, Enrich, and Share" Proceedings of the 16th International Conference on Multimedia 2008. Oct. 2008. (10 pages).

Cha, M., et al. "I Tube, You Tube, Everybody Tubes: Analyzing the World'S Largest User Generated Content Video System" Proceedings of the 7th ACM SIGCOMM Conference on Internet Measurement 2007. Oct. 2007. (13 pages).

Cherubini, M., et al. "Understanding Near-Duplicate Videos: A User-Centric Approach" Proceedings of the 17th International Conference on Multimedia 2009. Oct. 2009. (10 pages).

Colbaugh, R., et al. "Predictability and Prediction for an Experimental Cultural Market" Advances in Social Computing, Third International Conference on Social Computing, Behavioral Modeling, and Prediction, SBP 2010. Mar. 2010. (9 pages)

Crane, R., et al. "Viral, Quality, and Junk Videos on Youtube: Separating Content From Noise in an Information-Rich Environment" In Proceedings of AAAI symposium on Social Information Processing. Jan. 2008. (3 pages).

Gibbon, D., et al. "Large Scale Content Analysis Engine" Proceedings of the First ACM workshop on Large-scale multimedia retrieval and mining. Oct. 2009. pp. 97-104.

Hampapur, A., et al. "Comparison of Sequence Matching Techniques for Video Copy Detection" Storage and Retrieval for Media Databases 2002. Jan. 2002. (8 pages).

Ide, I., et al. "Genre-Adaptive Near-Duplicate Video Segment Detection" Proceedings of the 2007 IEEE International Conference on Multimedia and Expo, ICME 2007. Jul. 2007. pp. 484-487.

Iribarren, J., et al. "Impact of Human Activity Patterns on the Dynamics of Information Diffusion" Physical Review Letters, Vol. 103, Issue. 3. Jul. 2009. pp. 1-4.

Kennedy, L., et al. "Internet Image Archaeology: Automatically Tracing the Manipulation History of Photographs on the Web" Proceedings of the 16th International Conference on Multimedia 2008. Oct. 2008. (10 pages).

KR & KM Research Group. "K-CAP '09 Workshop on Social Media Analysis" Sep. 2009. Retrieved on Jul. 27, 2010. http://ki.informatik.uni-mannheim.de/soma09.htm.

Kwak, H., et al. "What Is Twitter, A Social Network or a News Media?" Proceedings of the 19th International Conference on World Wide Web, WWW 2010. Apr. 2010. (10 Pages).

Leskovec, J., et al. "Meme-Tracking and the Dynamics of the News Cycle" Proceedings of the 15th ACM SIGKDD International Conference on Knowledge Discovery and Data Mining. Jun.-Jul. 2009. (9 Pages).

Liu, T., et al. "Clustering Billions of Images With Large Scale Nearest Neighbor Search" 8th IEEE Workshop on Applications of Computer Vision (WACV 2007). Feb. 2007 (6 Pages).

Mathioudakis, M., et al. "Twittermonitor: Trend Detection Over the Twitter Stream". Proceedings of the ACM SIGMOD International Conference on Management of Data, SIGMOD 2010. Jun. 2010. pp. 1155-1157.

Nazir, A., et al. "Unveiling Facebook: A Measurement Study of Social Network Based Applications" Proceedings of the 8th ACM SIGCOMM Conference on Internet Measurement 2008. Oct. 2008. (14 Pages).

Salganik, M., et al. "Experimental Study of Inequality and Unpredictability in an Artificial Cultural Market" ScienceMag. vol. 311. Feb. 2006. (19 Pages). www.sciencemag.org/cgi/content/full/311/5762/854/DC1.

Schmitz, P., et al. "International Remix: Video Editing for the Web" Proceedings of the 14th ACM International Conference on Multimedia. Oct. 2006. (2 pages)

Siersdorfer, S., et al. "Automatic Video Tagging Using Content Redundancy" Proceedings of the 32nd Annual International ACM SIGIR Conference on Research and Development in Information Retrieval, SIGIR 2009, Jul. 2009. (8 Pages).

Sun, E., et al. "Gesundheit! Modeling Contagion Through Facebook News Feed" Proceedings of the Third International ACM SIGIR Conference on Weblogs and Social Media, ICWSM 2009, May 2009 (8 Pages).

Tan, H., et al. "Accelerating Near-Duplicate Video Matching by Combining Visual Similarity and Alignment Distortion" Proceedings of the 16th International Conference on Multimedia 2008. Oct. 2008. (4 Pages).

Tan, H., et al. "Scalable Detection of Partial Near-Duplicate Videos by Visual-Temporal Consistency" Proceedings of the 17th International Conference on Multimedia 2009. Oct. 2009. pp. 145-154.

Wu, X., et al. "Real-Time Near-Duplicate Elimination for Web Video Search With Content and Context" IEEE Transactions on Multimedia, Vol. 11, No. 2. Feb. 2009. pp. 196-207.

Zhao, W., et al. "Large-Scale Near-Duplicate Web Video Search: Challenge and Opportunity" Proceedings of the 2009 IEEE International Conference on Multimedia and Expo, ICME 2009. Jun.-Jul. 2009. pp. 1624-1627.

\* cited by examiner

FIG. 5A News
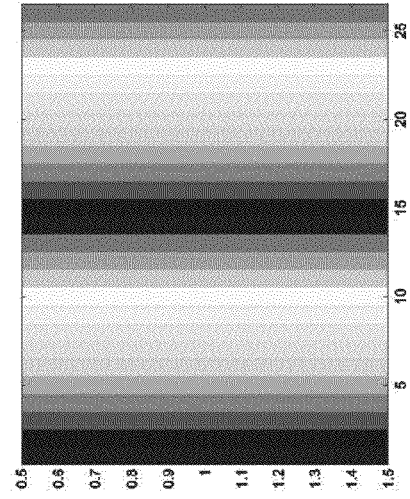
FIG. 5B Monologue
FIG. 5C Dialogue
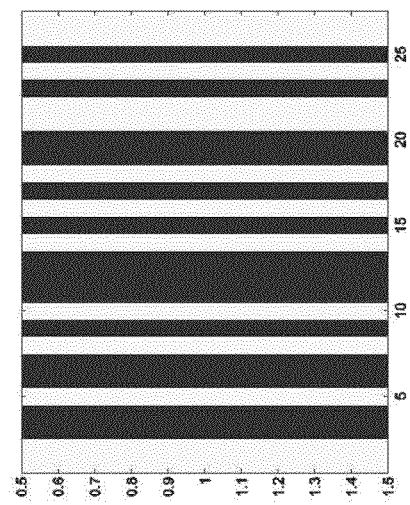
FIG. 5D Slideshow

USING NEAR-DUPLICATE VIDEO FRAMES TO ANALYZE, CLASSIFY, TRACK, AND VISUALIZE EVOLUTION AND FITNESS OF VIDEOS

RELATED APPLICATION INFORMATION

This application is related to commonly assigned co-pending U.S. patent application Ser. No. 12/909,137 filed currently herewith and incorporated herein by reference in its entirety.

BACKGROUND

1. Technical Field

The present invention relates to video processing and more particularly to systems and methods for dealing with a large video corpus to analyze, track, classify and visualize videos or portions thereof.

2. Description of the Related Art

Video data differs from purely textual data in several important ways. Video is often easier to generate, but it is harder to manipulate, compare, and query over. Consequently, social repositories of video data such as YouTube™ depend on verbal title, tags, and descriptions for searching, even though each of these textual records can bear little relation to the actual video content. Sometimes this inaccuracy is deliberate for spamming purposes, but often it is due to the honest polysemy of words.

It is difficult to find a precision answer to a query with video. Retrieval of video content may be complicated by a server's heuristic attempts at query expansion, such as including videos whose supposed relevance to the query comes mainly from their popularity, or from their collocation within ill-formed playlists where other videos are in fact legitimate responses.

There are very many videos that are digitally accessible, but current search engines do not "look" at the videos, they simply describe the videos in words. Finding videos that are related to each other is difficult, and little progress has been made in this area, especially on large depositories like YouTube™.

SUMMARY

A system and method for analyzing video include segmenting video stored in computer readable storage media into keyframes. Near-duplicate keyframes are represented as indices, and videos are represented as a sequence of indices. The near-duplicate keyframes are rendered in a graphical representation to determine relationships between video content.

A system in accordance with the present principles includes a processor and a memory coupled to the processor and configured to store a module for analyzing video. The module is configured to segment video stored in computer readable storage media into keyframes; represent near-duplicate keyframes as indices; and render the near-duplicate keyframes in a graphical representation to determine relationships between video content.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 5A-5D show near duplicate keyframes encoded to be identified as belonging to a specific genre in accordance with another embodiment;

DETAILED DESCRIPTION OF PREFERRED EMBODIMENTS

Figure 1:
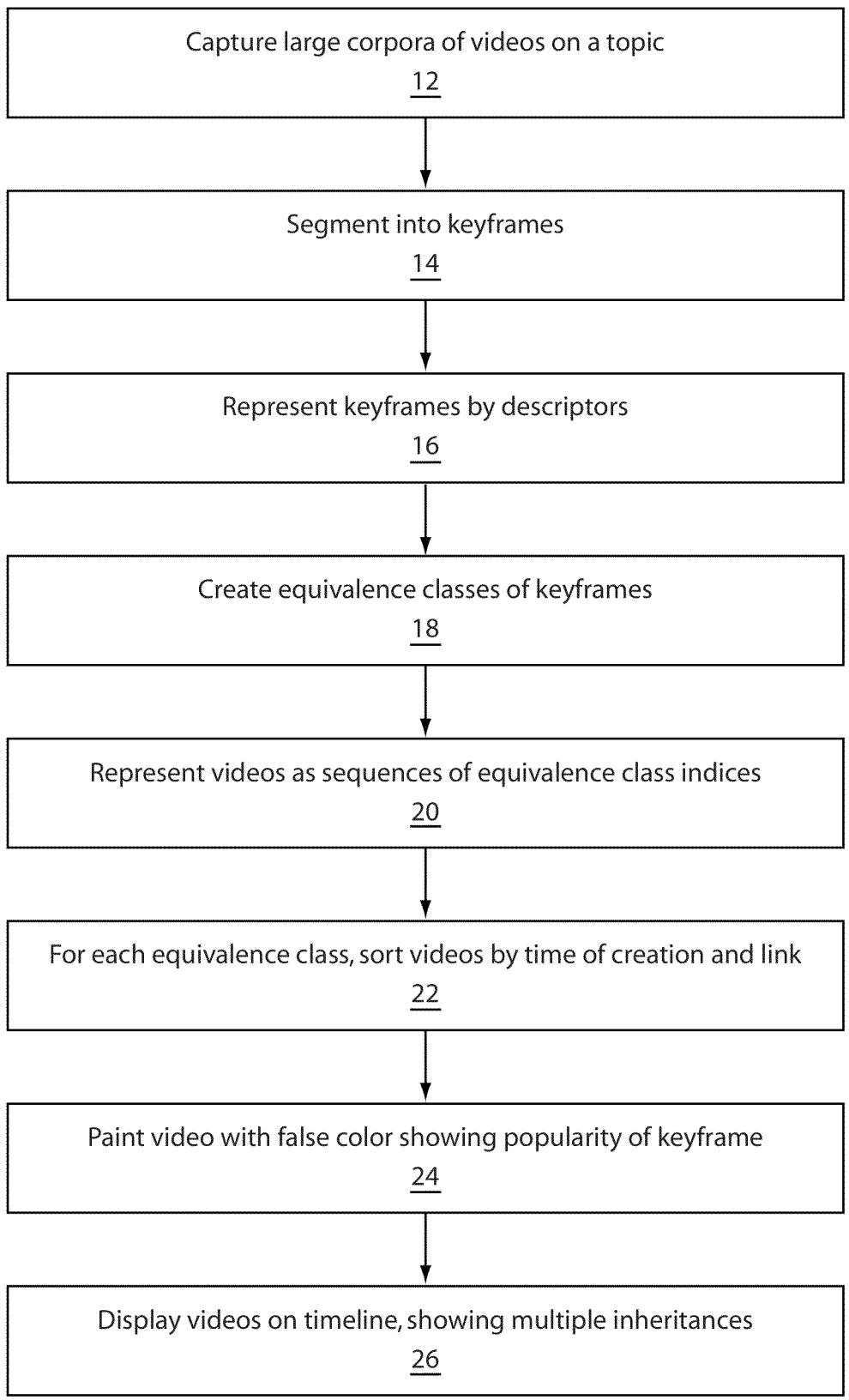
FIG. 1 is a block/flow diagram showing a system/method for analyzing videos including classifying, tracking, comparing and visualizing in accordance with the present principles.

In accordance with the present principles, systems and methods for tracking, analyzing, classifying videos are provided. In one embodiment, videos within a depository compete for view counts like organisms within an ecology compete for survival. Video "genes" are composed of "near-duplicate keyframes", which are those frames within the entire corpus of videos that are very similar in physical appearance (colors, sizes, shapes, visual composition of objects, etc.,) and that appear in several different videos. These near-duplicate keyframes or "near-dups" include very useful information in their temporal sequence or evolution, within the video and across long stretches of time as the videos "evolve". Criteria for determining near-dups may be set as desired. These sequences of near-dups permit easy handling of problems in classifying, annotating, retrieving, comparing, and ranking videos.

These videos are utilized to clean up responses given by current video retrieval engines, to locate those videos that are most typical or which best summarize a given topic of interest, to compare at high speed two videos for similarity or for copying, to classify videos as news, monologue, dialogue, slideshow, etc.

Another feature teaches how to visualize relationships among videos in terms of both their relevance to the topic, and their relationship over time to other videos that are similar. This feature shows, in a way similar to a family tree, how important parts of a video are inherited from predecessor videos. One of the advantages includes that a much larger group of videos can be understood at a glance than has previously been possible. In a single display, videos that are most relevant to a topic (e.g., which best summarize a topic), and a form that the video takes (newscast, debate, etc.) can be located. The processing time for these analyses and displays is much faster, and the comprehensiveness of coverage is much greater, than prior art systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with the present principles, an analogy between videos and genetics is employed for classifying, analyzing, displaying videos. In Table 1, a concept mapping between an ecosystem and a social video depository is provided to suggest useful representations and powerful tools that can be employed. Table 1 indicates a plurality of commonalities, together with an estimate of the relative sizes and frequencies between the two domains. For example, most ecologies are more massive in numbers than video depositories (see the "relative size" column for such an indication). On the other hand, many more videos are usually found together in playlists than there are organisms found living together in symbiosis.

TABLE 1

A social video depository acts like a biological world.

| Concept | Biology | Relative Size | Videos |
|---|---|---|---|
| Environment | An ecology | > | Video Depository |
| Discrete form | Organism | > | Video |
| Observables | Phenotype | > | Genre |
| Composition | Genotype | = | "Grammar" |
| Encoding | Amino acid, ACGT | < | Near-duplicate |

TABLE 1-continued

A social video depository acts like a biological world.

| Concept | Biology | Relative Size | Videos |
|---|---|---|---|
| Entire genome | DNA | > | Clip sequence |
| Functional | Amino acid family | | Virality rank |
| Nonfunctional | Intron | > | Editorialization |
| End protect | Telomeres | > | End credits |
| Categorization | Phylogenetic tree | < | Timeline trace |
| Seq alignment | Smith-Waterman | = | Dyn Time Warp |
| Multi align | Clustal | > | Clustal-like? |
| Misalignment | Genetic gap | = | Segment bug |
| Repeat detect | Electrophoresis | < | Lempel-Ziv |
| Display color | By amino acid family | < | By "hotness" |
| Natural selection | Food, reproduction | = | Views |
| Mutualism | Symbiosis | < | Playlist |
| Reproduction | Sexual | < | Mashup |
| Reproduction | Asexual | < | Copying |
| Interbreeding | Within species | > | Within topic |
| Evolution | Genetic drift | | Story drift |

Some of the parallels are straightforward. Videos follow grammar rules of good formation (genotypes), and have immediately observable differences by genre (phenotypes). The sequences within and across short clips tend to be preserved, except for editorial inclusions (introns) and superfluous beginnings and endings (telomeres). Their relationships to each other can be traced by their reuse of near-duplicate shots (phylogenetics), discoverable through time-flexible matching algorithms (e.g., Smith-Waterman and Clustal). Near-dups are sometimes dropped or interrupted (genetic gaps), but their basic patterns of repetition are indicative of structure, which can be displayed graphically (electrophoresis). Competition for views can be enhanced by coexistence on playlists with related videos (symbiosis), or by copying (asexual reproduction) or by mashups (sexual reproduction), leading to evolution of content (genetic drift).

Nevertheless, we note that there are some differences in the orders of magnitude that distinguish the two domains. As noted in Table 1, compared to the genes that make up the DNA of an organism, near-duplicate keyframes of a video are made from a much larger alphabet, and each video encodes a much shorter sequence of them. Although this simplifies video analysis, it impairs the use of many genetic visualization techniques, such as the simple false-coloring of base pairs or amino acids in displays of lineage or similarity.

On the other hand, videos come with timestamp information, so their inheritance and evolution are much easier to know with certainty. One of the most important parallels, however, is that genetics encodes information within grammatical sequences; unlike bag-of-X approaches, sequential temporal information, both intra- and inter-video, encodes and yields critical information about genre and ancestry.

By employing this analogy, classification and analysis of videos can be performed. In this way, solutions for exploring very large corpora of videos are provided to: 1) Improve precision and eliminate off-topic videos; 2) Locate "hot" clips and "hot videos"; 3) Trace history and locate summary videos if present; 4) Compare videos quickly based on content; 5) Determine origin and changes of videos; 6) Classify videos into genres. The present embodiments may be developed and employed in any edited video domain.

Referring now to the drawings in which like numerals represent the same or similar elements and initially to FIG. 1, a block/flow diagram for a system/method for processing videos is shown in accordance with one illustrative embodiment. In block 12, a corpora of videos is captured, collected, and/or stored on a topic. The corpora may include a video website, a video library, etc. In block 14, the videos are segmented into keyframes. Segmentation may be performed based upon any criteria, e.g., spatial, temporal, color, sequence, etc. In block 16, keyframes are represented by descriptors. The descriptors may include an indexing or encoding scheme to represent the keyframes. In block 18, equivalence classes of keyframes are created. In block 20, the videos are represented as sequences of equivalence class indices. In block 22, for each equivalence class, videos are sorted by time of creation and linked. In block 24, the video is painted with false color showing popularity of keyframes. In block 26, videos are displayed on a timeline, showing multiple inheritances.

In accordance with the present principles, videos are considered organisms and near-duplicate keyframes (near-dups) are considered genes. Near-dups are comparable to clips, but simpler to detect, cluster, track, compare, and display. Data collection may be performed via spidering or other techniques (block 12). Video datasets are usually very imbalanced. For example, most "popular" videos may not be on-topic and very unequal view distributions may occur.

For a case study, 5.4K videos were analyzed, including 210K keyframes segmented from the videos (block 14). A same extraction method was employed for the keyframes which included size normalization, color-correlogram-cross feature extraction, FLANN (Fast Library for Approximate Nearest Neighbors) lookup and equivalence class clustering, etc.

Color correlogram data are only an approximation of content, and may oversegment videos during camera movements. Some object recognition may be helpful in this instance. The distribution of near-dups across an ecology in the data set analyzed in this example seemed to follow a Zipf-like power law, but with an exponent of about $-\frac{2}{3}$, that is, with a longer and more diverse tail than Zipf expects.

Just as amino acids are grouped into families with common functional roles, near-dups most likely occur in families that have common semantic meanings (e.g., commentator, crowd, outdoors, establishing shot, etc.). Inheritance may be defined as occurring due to multiple inheritances within a temporal window, rather than through a single near-dup transmission, although a single near-dup transmission may be employed.

For some topics, a video summary may already exist within the ecology. As a topic drifts, it may become necessary to construct a video summary instead, e.g., through a disciplined automatic mashup algorithm.

In accordance with one embodiment, visualization of the videos in the case study may be provided as follows. First, near-dups ("genes") were tracked. This included finding all videos with a given near-dup (block 16, 18, 20), sorting by temporal order of first posting date and time (block 22), and linking immediate temporal neighbors only (block 22). This provides a transitive reduction (the opposite of transitive closure) of the temporal relationships and induces a simple path through the videos.

The present embodiments may be employed in video repository domains (e.g., YouTube™) or any other edited video domains including news applications, commercial or corporate libraries, blogs, social networking sites, etc.

With continued reference to FIG. 1, a case study of YouTube™ that was performed will be described. In block 12, 200K videos were collected and their metadata from YouTube™, on 22 different topics. One topic includes the "Iran" dataset, for which a spider repeatedly made about a dozen queries through the YouTube™ application programming interface (API), each of the form, "Iran election", "Iran president", "Iran controversy", etc. These queries retrieved about 5.4K unique videos, eventually being segmented and yielding about 210K keyframes in block 14. A second topic, "Housing", provided ground truth for tuning the present methods. About 15K near-dup pairs and 25K non-near-dup pairs from this dataset were hand-annotated and verified.

To compare keyframes, they were first normalized spatially and through histogram equalization, then the four corners of each image were masked away to reduce interference by added text and graphics, then features were extracted from the remaining cross-shaped region based on hue, saturation, value (HSV) color correlograms. In block 16, each keyframe's resulting 332-component descriptor was then indexed for k-nearest neighbor lookup with respect to the $L^2$ distance metric. Other methods for describing keyframes are well known in the art, for example, methods based on local or global color, texture, optic flow, similarity to known models, etc., and give similar descriptors.

The Fast Library for Approximate Nearest Neighbor (FLANN) package was used to establish classes of similar keyframes. Other methods well known in the art may also be employed. For performance, we set a heuristic limit on number of neighbors searched, equal to $\sqrt{N}$ where N is the size of the keyframe set. Only those neighbors were kept which were within an adaptive threshold that was sensitive to descriptor complexity. In block 18, equivalence classes of near-duplicates resulted from an efficient union-find variant for the transitive closure of these neighbor relations. On this dataset, this method created about 2.5K near-dup classes; over all datasets, precision was 98%, recall was 80%, and the F1 composite measure of retrieval was 88%, at a total cost of $O(N \sqrt{N})$ per dataset.

By examining these near-dup classes, it was not hard to discover that YouTube™ appears to answer queries using a (proprietary) query expansion algorithm to enhance recall, but often at the cost of lowered precision. It appears to select very popular but off-topic videos if they happen to share a playlist with other videos that directly satisfy the query, and it appears to weight this selection proportionately by view count. Since many playlists are off-topic and ill-specified (e.g., "My Favorite Videos"), contamination of the response set results. In the case study dataset, the 4 most popular videos were so off-topic that they shared no near-dup keyframes with any other videos at all. This was also the case for 7 of the top 10 most popular videos. For videos in the top 10% of popularity (which gathered almost all the total views), the likelihood of having a near-dup was below the average of the dataset as a whole, which was about 0.58. However, noting their lack of near-dups, these off-topic "invasive species" are easily detected, and they, in fact, do not "interbreed" with other near-dups.

In general, this particular topic domain, like many others, is characterized by a very unequal distribution of views, as measured by the Gini coefficient used in biodiversity studies. Gini computes a state of pure equity as a value of 0. Applied here, it would mean each video has exactly the same number of views. A Gini coefficient of 1 indicates that all resources are possessed by a single entity. Here, one video would have all the views. The Gini coefficient of the case study dataset is 0.94, whether one looks only at those videos with near-duplicates, or includes those without. This value far exceeds the Gini coefficient of inequality for the distribution of monetary wealth in any country, which has its maximum at about 0.7 for Namibia.

Additionally, we have noted that the member keyframes of a near-duplicate class tend to be temporally collocated preferentially with members of only very few other near-duplicate classes. Further, the temporal order of these pairings tends to be preserved across videos. This can be seen by examining bigram statistics, which record the frequency of adjacent pairs of near-dups within a video.

If B is a matrix that counts at B(i,j), the number of times in the video ecology that a near-dup from class i is followed by a near-dup from class j, then B is shown to be heavily asymmetric. A standard definition of asymmetry represents B as the sum of a purely symmetric matrix $S=(B+B^T)/2$ and a purely anti-symmetric matrix $K=(B-B^T)/2$, and defines the amount of asymmetry as $0 \leq \alpha \|K\|/\|B\| \leq 1$, where the norm can be chosen as appropriate. The extreme values of $\alpha$ occur exactly where expected. For some norms, our case study dataset has $\alpha=0.6$, and if the diagonal of matrix B (which encodes the self-succession of near-dups) is omitted, $\alpha=0.7$. Observation confirmed the severe non-Markovian property of near-dups, with many identical long chains of near-dup classes repeating within and across videos. One conclusion is that the unit of video virality is more properly that of the keyframe sequence, that is, a clip; here we use individual near-dups as an efficient proxy.

The genetic inheritance of videos may be defined via the simplest possible approximation: as an unweighted directed link between a pair of videos that share a single near-dup, but restricted to only those pairs which are immediately temporally adjacent. This is a case of transitive reduction (that is, the inverse to transitive closure), where each near-dup induces its own single time-based simple path through the video ecology.

Figure 2:
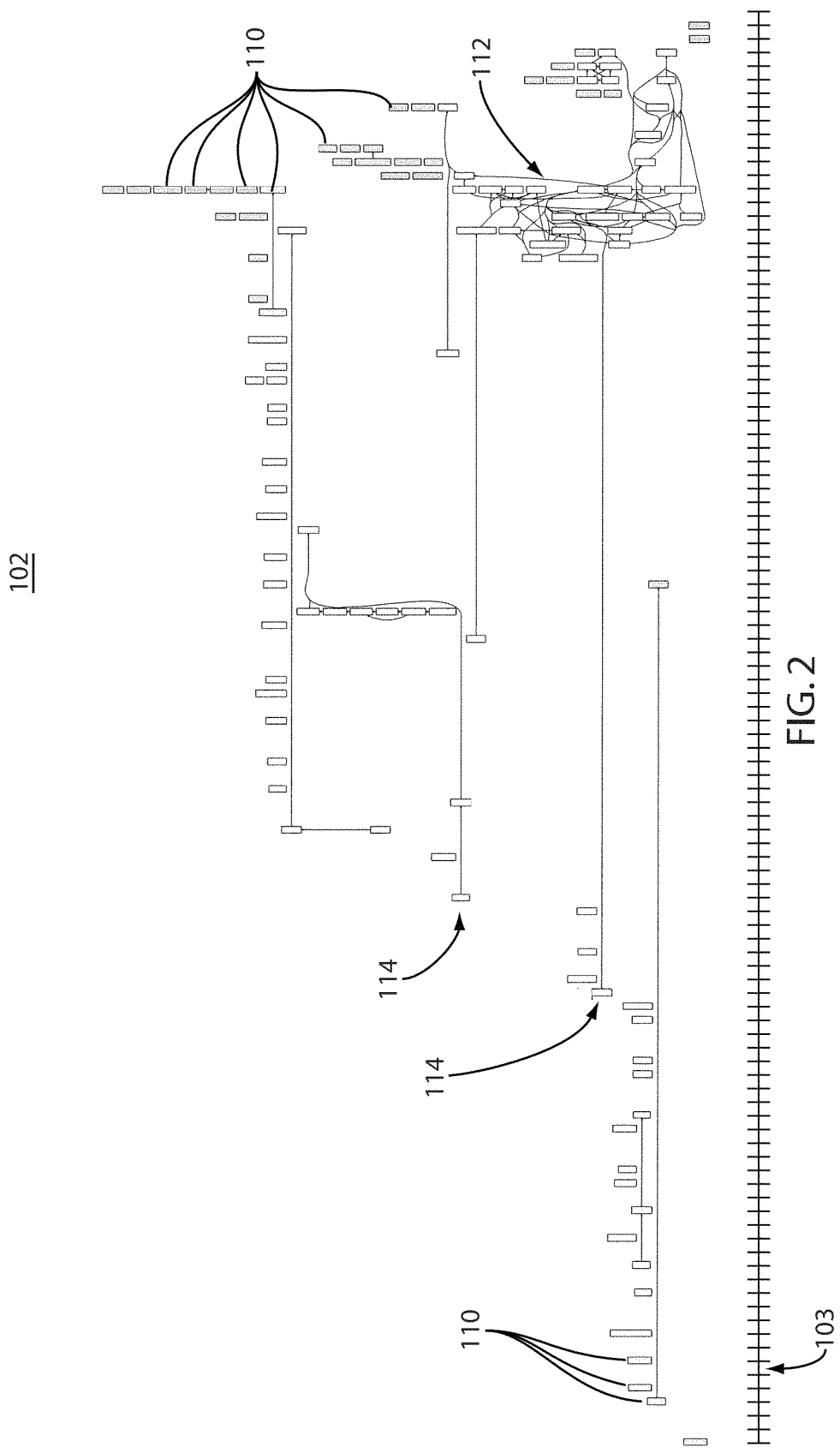
FIG. 2 is a graphical representation of temporally tracked videos (e.g., history and/or inheritances) in accordance with one embodiment.

Referring to FIG. 2, a machine-generated graph 102 presents, in greatly reduced and symbolic form, the inheritances of near-dups within the case study dataset on Iran. At a glance, although there are many isolated components, videos tend to generate and interbreed in synchrony with important events (news events, or other occurrences). We also note that initial videos about an event tend to acquire more views than later ones, and they also tend to be subject to more evolution. In FIG. 2, arcs represent re-occurrence of one or more near-dup frames.

When completed for all near-dups, a family tree or a directed acyclic graph (DAG) may be generated. The graph may be displayed against a time-grid 103 as depicted in FIG. 2.

Time scale 103 shows temporal events. Depending on the scenario, logarithmic or other relationships may be employed to scale the graph to provide a reasonable display or permit a reasonable interpretation of the data, e.g., width may be proportional to the logarithm of the number of views or postings. Graphical tools may be employed to generate the visualizations in accordance with the present principles.

FIG. 2 immediately shows many isolated components, e.g., components 110, which may be videos that are off-topic. Interbreeding is shown at 112, which is the mixing of a near-dup with other content. This often happens in synchrony with important events, for example, a posting of a news event which may be parodied by others or reposted. A new video, shown at 114, may acquire more views, but it is also subject to more evolution over time.

Because keyframes are clustered or classed according to near-dup similarity in block 18, and these classes are then sorted and numbered according to their cardinality (or other method) in block 20, we can use either this near-dup class number, or the cardinality itself, as a rough indicator of near-dup virality or popularity. In block 24, this can be visualized, using a hot false-color scheme, which is based on blackbody radiation (black, red, orange, yellow, white in that order) (see FIG. 3). A virally "hot" keyframe shows up as white, and an infrequently used one as black.

Figure 3:
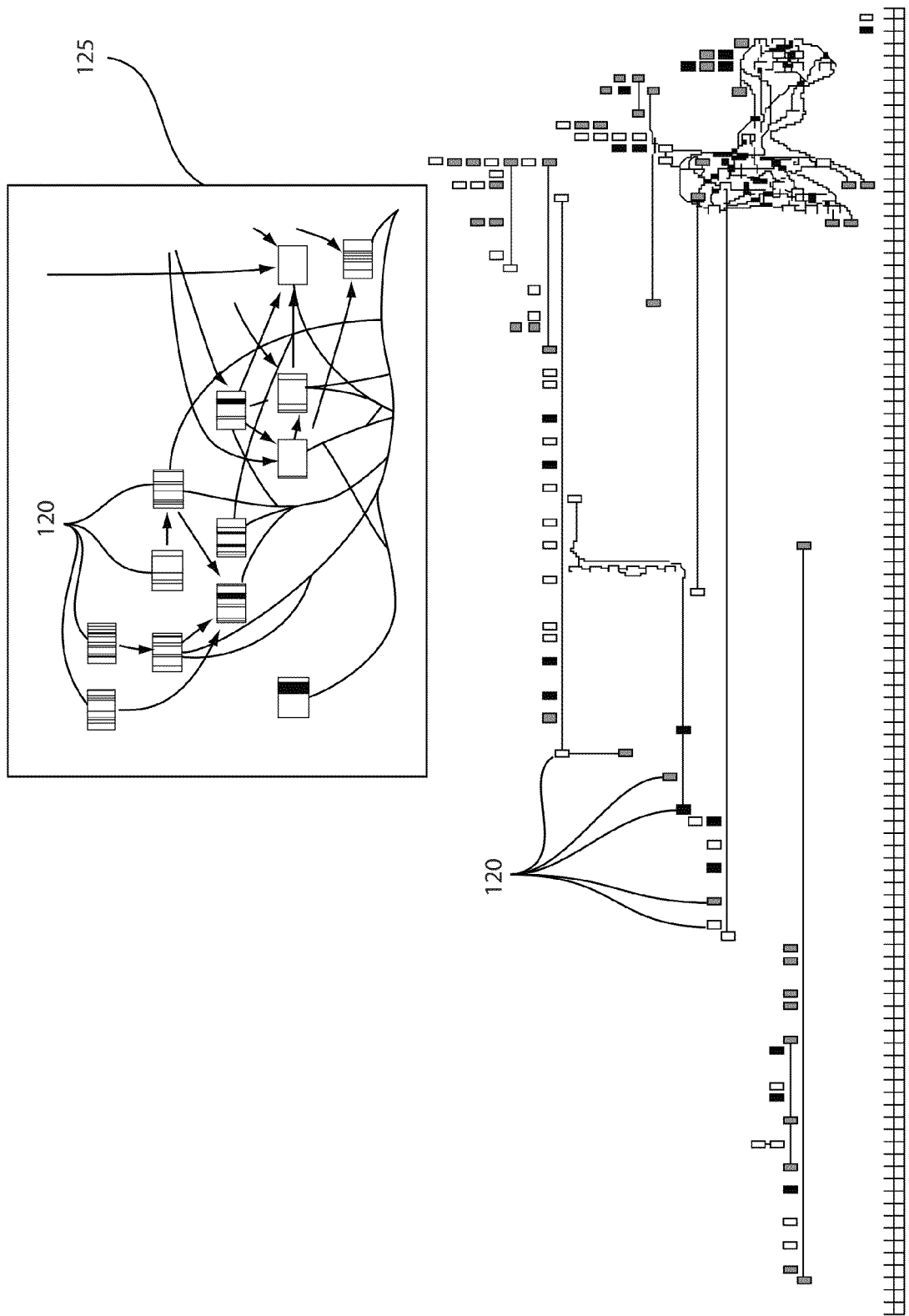
FIG. 3 is a graphical representation showing encoded near duplicate keyframes temporally graphed in accordance with another embodiment.

Referring to FIG. 3, the visualization uses a fixed size box for each video 120, and shows within the box, as vertical stripes, all of the near-dup keyframes detected in temporal order within those videos. In this example, only keyframes with at least 15K views are visualized. Each box has a kind of cytogenic banding pattern. An inset image 125 shows a magnified view of the videos 120 so that cytogenic patterns are more visible. Even though this encoding is many-to-one (2.5K near-dup classes into, e.g., 64 false colors), a video with many viral near-dups should show up as a box that is close to all white.

This visualization suggests three features. First, any news summary videos already present in the ecology show up immediately as white boxes. Secondly, mashups show up as a confluence of inheritance arrows onto a box with a pronounced striped pattern, reflecting the video's alternation of many "hot" near-dups with "cold" unpopular interjected title slides and editorializing frames. Third, many extended near-dup sequences have been transmitted essentially in their entirety.

Cardinality of a near-dup equivalence class may be employed to designate "hotness" (popularity) of the near-dup. Encoding may include false-color "hotness" using a blackbody radiation scale, e.g., black, dark red, red, orange, yellow, pale yellow, white (white being the hottest) similar to cytogenic bands as shown in FIG. 3. Other visualization methods that include different encodings of the near-dups (or genes) are also contemplated Similarity between videos may be determined by matching videos using genes. Genetics tools such as the Smith-Waterman algorithm of genetics may be employed to match videos.

Figure 4:
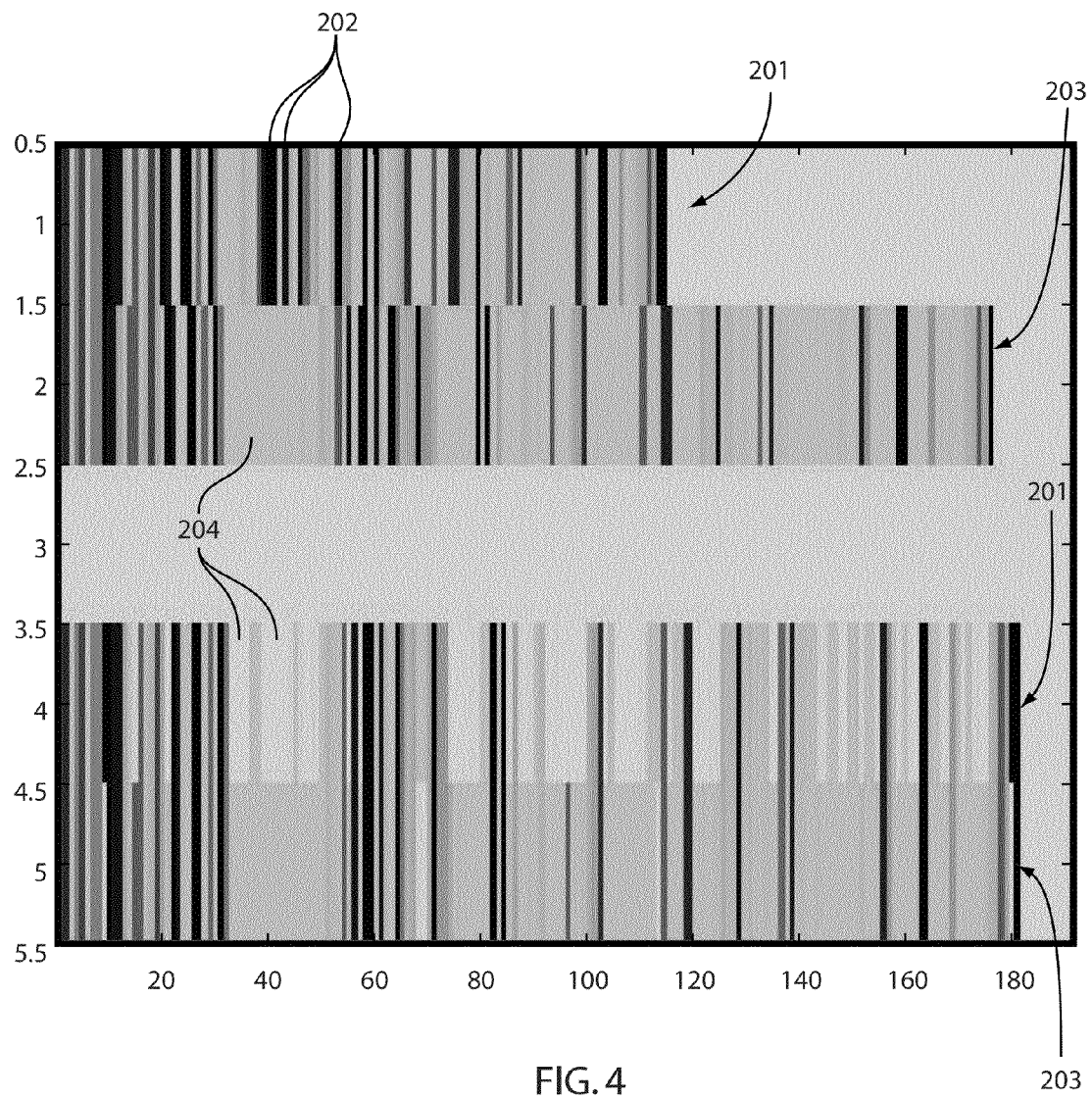
FIG. 4 is a graphical representation showing near duplicate keyframes aligned using a Smith Waterman algorithm to determine similarity in accordance with another embodiment.

Full Video Similarity via Smith-Waterman: Since a full video is represented by a sequence of near-dup class numbers, two videos can be compared using an extension of the Smith-Waterman algorithm of genetics, which is a simplified and discretized form of dynamic time warping (DTW) that assigns penalties to component mismatches and to sequence gaps. Because the algorithm works on a derived sequence of integers (and not on features, images, or clips), it is fast. An example of its use in aligning two videos is shown in FIG. 4, which includes before and after alignments of a pair of clips 201 and 203, where the near-dup classes have been assigned false colors (for bands 202) arbitrarily for illustration purposes. Gaps 204 and mismatches are perceived instantly. Since many long videos are reposted with only a few added editorializations at their beginning or trimmed credits from their ending, they are especially informative. Any gaps within matched pairs of the video tend to indicate a failure of the keyframe detector, and any mismatches tend to indicate an overgranularity of keyframe clustering. (A similar observation can be made about the internal self-matching of talkshow and slideshow videos). These inaccuracies can provide very useful non-manual ground truth feedback for tuning the sensitivities of the earlier algorithms that detect and cluster the near-duplicates.

As a bonus, the Smith-Waterman match induces a true distance metric on the videos. The total number of gaps necessary to form a minimal cost match between a pair of sequences is in fact positive-definite, symmetric, and subadditive. We can therefore create an induced distance matrix of a video ecology to study the sparsity of its interconnectivity. Both visualization and direct computation indicate that in our case study dataset, interrelationships are on the order of only 1%. This may be illustrated using the heuristic Reverse Cuthill-McKee algorithm to permute the interconnection matrix to dramatize its sparsity. This means that, in general, despite much inheritance, any two specific videos retrieved using a query are unlikely to be related to each other, simply given the large number of videos in the total collection.

Genre via Motifs: We have noted that by observing the patterns of near-dup repetitions within a video, it is often easy to tell the video genre, regardless of near-dup content, by using what geneticists call motifs. We illustrate this with an example that is very roughly the equivalent of gel electrophoresis in genetics. A video is represented as a sequence of near-dup class numbers, which are integers. By applying a degenerate form of Lempel-Ziv encoding to this sequence, we can capture the periodicity of the content. For example, if the video is of the form ABAABABBA, where A and B are two (large, positive) near-dup class numbers, this sequence can be compressed losslessly into 002132213, where each (small, non-negative) code integer captures the LZ "distance" of each original integer to its most recent previous occurrence. Ignoring any of the 0s, which indicate new content, this LZ code can now be histogrammed to find peaks, which will correspond to length of the periods of repetition of content. In the example, this histogram would be 232, corresponding to 2 instances of the code of 1, 3 of the code of 2, and 2 of the code of 3.

Except for some expected blurring, videos having a single static frame or of a monologue, which is almost the same thing, have LZ code histograms with modes at 1; dialogues such as host-plus-guest talk shows have histogram modes at 2 (as in the example above). Slideshows accompanying music or spoken text have modes at P, where P is the number of independent slides that are cycled through, and news programs and mashups have no discernible period at all, since their codes are mostly 0s. These patterns also easily show up, of course, in false-color displays, as shown in FIGS. 5A-5D. Viral near-dups tend not to come from videos with periodicity; they tend to originate from news.

News in FIG. 5A has no histogram (LZ is nearly all 0s). A monologue and/or music-only is shown in FIG. 5B and peaks near 1. Talk shows (dialogue) in FIG. 5C peak near 2. Talkshows have regular biphasic rhythms ("equal time"). Slideshows in FIG. 5D peak at a value near their period. High virality rarely comes from videos with a peak.

Multiple sequence alignment is provably NP-hard, with V videos of length L taking $O((2L)^V)$ time. So, various heuristic approaches, like the Clustal family of algorithms in genetics may be employed to find and verify all near-duplicate videos.

Basing a taxonomy of genres solely on period may be improved upon by employing better grammar-based methods derived from constraints on how a story is told, etc. Such methods may employ a kind of compiler to parse near-dups into their functional roles, and sequences of them into a composite meaning. The amount of "genetic drift" (topic drift) probably varies from genre to genre, but it may be near-constant within one genre.

Figure 6:
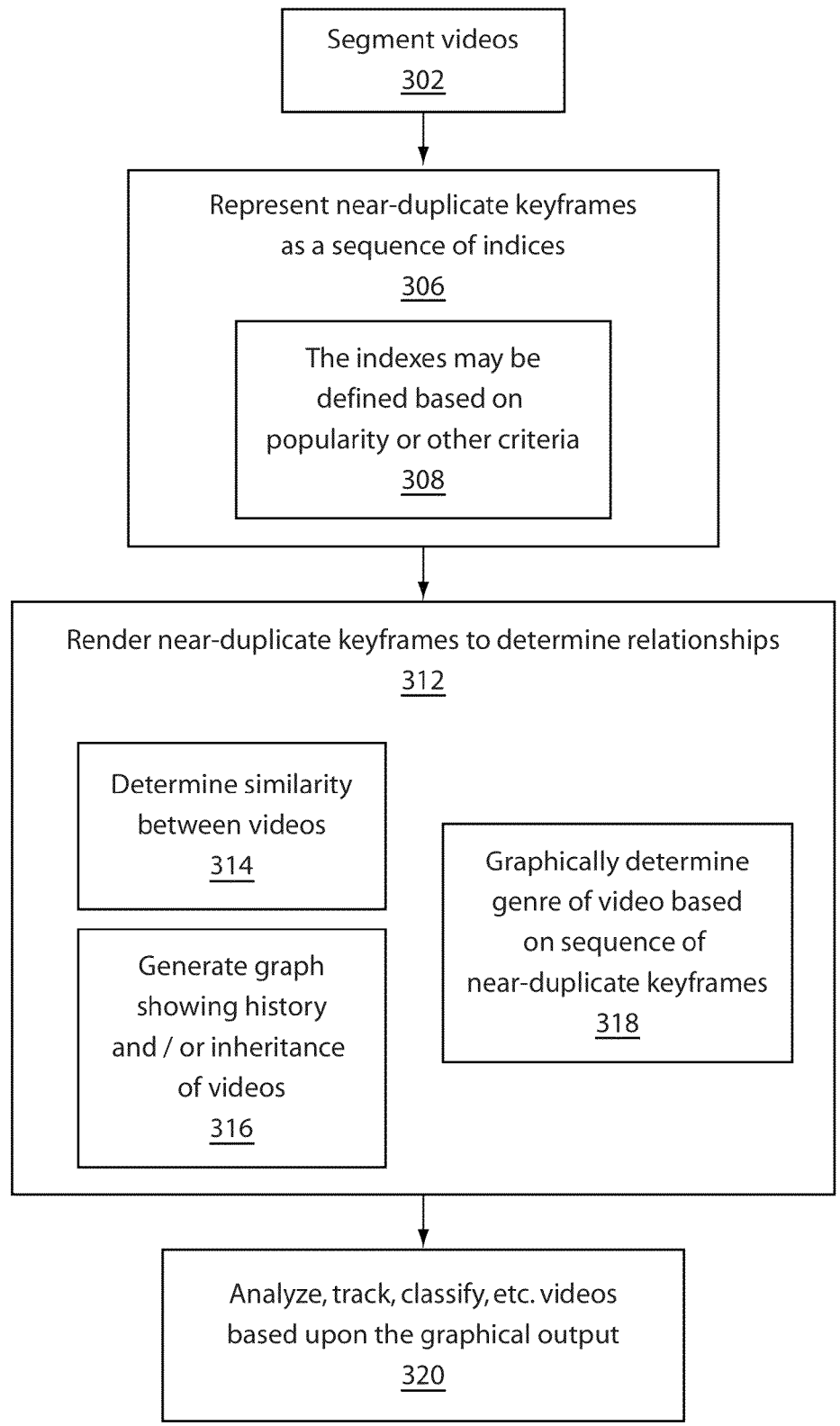
FIG. 6 is a block/flow diagram showing a system/method for analyzing videos in accordance with another embodiment.

Referring to FIG. 6, a system/method for handling video content in a video corpus or other collection of videos is illustratively shown. In block 302, video stored in computer readable storage media is segmented into keyframes. The criteria for segmentation may include any subject, video content feature, scene changes, color changes, tags information, metadata, etc.

In block 306, near-duplicate keyframes are represented as a sequence of indices. In one embodiment, near dups may be classified into groups or classes. All members of a class may be represented by a value, color, or other index or encoding. In block 308, the representation of the near-duplicate keyframes may include indexes in accordance with popularity of the near-duplicate keyframes or employ other criteria. The popularity of the keyframes may be rendered according to a false-color scheme. The sequence of indices may include integers, colors, or other descriptors wherein an index value represents a class of near-duplicate keyframes.

In block 312, the near-duplicate keyframes are rendered in a graphical representation to determine relationships between video content. In block 314, a similarity between two videos may be determined by aligning and comparing respective key frame sequences. A Smith-Waterman method may be employed to re-align the videos to provide a band and gap representation of the near-dup keyframes. In this way, a side-by side comparison provides an immediate visual result.

In block 316, a graph may be generated to temporally show a history or to show inheritance features of one or more near-duplicate keyframes. A family tree or directed acyclic graph may be provided to show the inheritance or multiple inheritances of each video. The relationships between video content may include one or more of: non-relevant videos, videos whose parts have been incorporated into other videos, summary videos within a corpus of videos; and mashup videos within a corpus of videos.

In block 318, the genre of a video may be determined based upon a visual rendering of the sequence of near-duplicate keyframes. The genres may include one or more of: news videos, videos collecting images from other videos, monologue videos or videos with a single image, talkshow videos, slideshow videos, etc. In block 320, videos with determined relationships are graphically rendered, tracked, classified, analyzed, etc., as needed.

Figure 7:
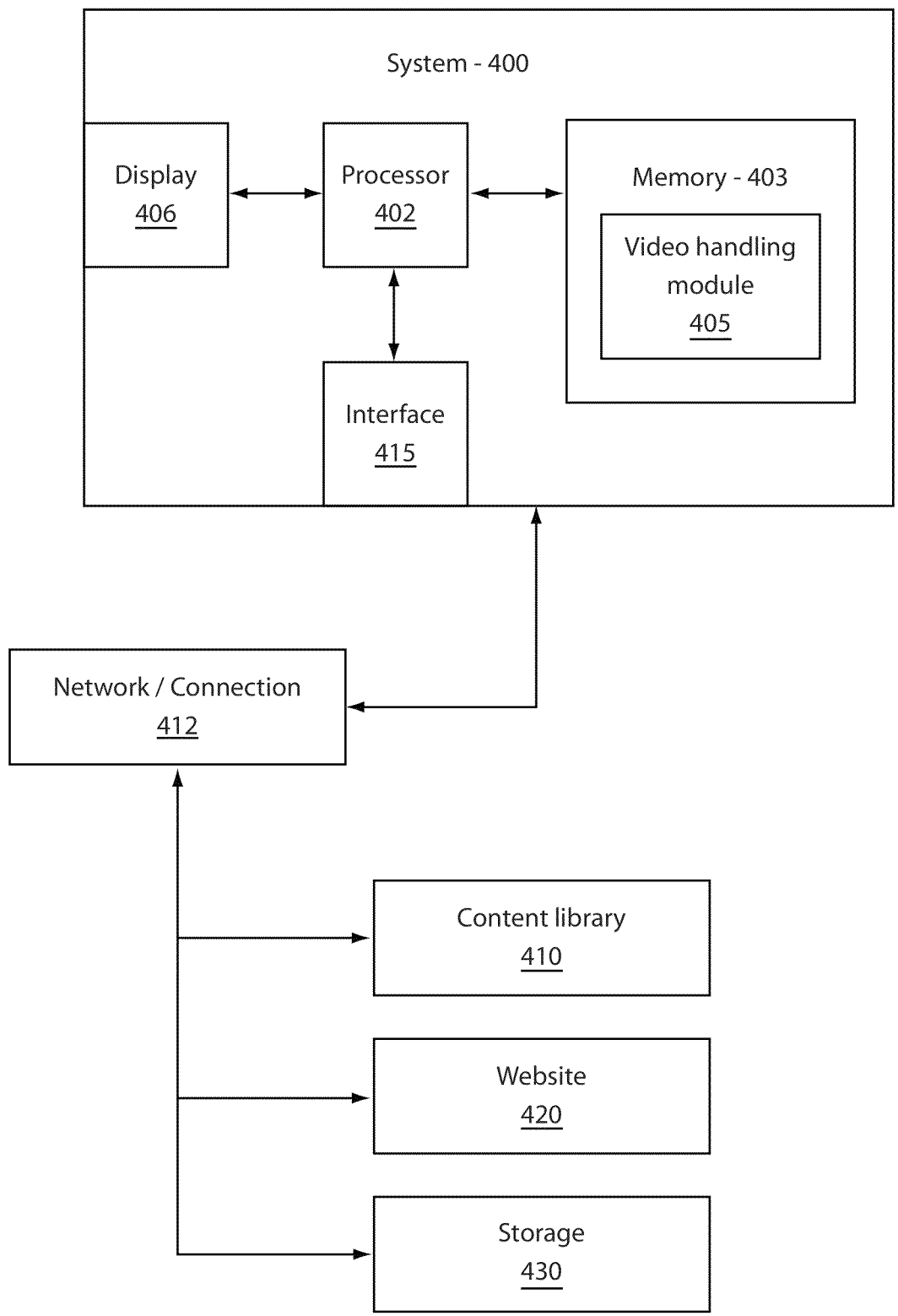
FIG. 7 is a block diagram showing a system for analyzing videos in accordance with the present principles.

Referring to FIG. 7, a system 400 for evaluating video content is illustratively shown. System 400 includes one or more processors 402. System 400 includes a memory 403 coupled to the processor 402. The memory 403 includes a video handling module 405 configured to segment video stored in computer readable storage media into keyframes; represent near-duplicate keyframes as indices; and render the near-duplicate keyframes in a graphical representation to determine relationships between video content. The system 400 includes a display 406. Indexed near-duplicate keyframes are displayed on display 406, e.g., in accordance with popularity in a false-color scheme.

The module 405 is configured to generate a graph to temporally show a history or inheritance of one or more near-duplicate keyframes. The module 405 may also be configured to determine a similarity between two videos by aligning and comparing respective key frame sequences and determine a genre of a video based upon a visual rendering of the sequence of near-duplicate keyframes. For example, the indices of the keyframes are determined in accordance with near-dup classes based on similarity, and then the popularity of the class is measured (e.g., number of occurrences, etc.) and possibly displayed. In one embodiment, the Smith-Waterman or other method may be stored in memory 403 and executed to perform re-aligning and comparing of the key frames.

The system 400 may operate with input from a user through user interface 415. The user may adjust the graphically rendered output to analyze and draw conclusions about videos rendered using module 405. The system 400 may include or be included in a computer, a telephone, a software application, or other computing device. The system 400 may connected to a network 412, wireless connection, wired connection or any other known connection type or channel to enable communication with a content library 410, a web site 420 or other storage device 430 with a corpus of videos.

Having described preferred embodiments of a systems and methods for using near-duplicate video frames to analyze, classify, track, and visualize evolution and fitness of videos (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    segmenting video stored in computer readable storage media into keyframes;
    representing near-duplicate keyframes as a sequence of indices; and
    rendering the near-duplicate keyframes in a graphical representation to determine relationships between video content, wherein the graphical representation includes a relevance to a topic and a relationship over time between similar videos within a corpus of videos.

2. The method as recited in claim 1, wherein representing includes representing near-duplicate keyframes classes with indices based upon similarities between the near-duplicate keyframes.

3. The method as recited in claim 2, wherein a popularity of the classes is determined and rendered using a false-color scheme.

4. The method as recited in claim 1, further comprising determining a similarity between two videos by aligning and comparing respective keyframe sequences.

5. The method as recited in claim 1, wherein rendering the near-duplicate keyframes in a graphical representation includes generating a graph to temporally show a history of one or more near-duplicate keyframes.

6. The method as recited in claim 1, wherein rendering the near-duplicate keyframes in a graphical representation includes generating a graph to show inheritance features of one or more near-duplicate keyframes.

7. The method as recited in claim 1, wherein the relationships between video content include one or more of: non-relevant videos from those returned by a search engine; videos whose parts have been incorporated into other videos; summary videos within a corpus of videos; and mashup videos within a corpus of videos.

8. The method as recited in claim 1, wherein the sequence of indices includes one of integers, colors, and a set of descriptors, with indices being grouped into one or more classes of near-duplicate keyframes, and classes of near-duplicate keyframes being represented by index values.

9. The method as recited in claim 1, wherein rendering the near-duplicate keyframes in a graphical representation includes determining a genre of a video based upon a visual rendering of the sequence of near-duplicate keyframes.

10. The method as recited in claim 9, wherein the genre includes one or more of: news videos, videos collecting images from other videos, monologue videos or videos with a single image, talkshow videos and slideshow videos.

11. A method, comprising:
    segmenting video stored in computer readable storage media into keyframes;
    representing near-duplicate keyframes by descriptors;
    creating equivalence classes for the near-duplicate keyframes;
    representing videos as sequences of equivalence class indices;
    sorting and linking videos in at least one equivalence class; and rendering the near-duplicate keyframes in a graphical representation to determine relationships between video content, wherein the graphical representation includes a relevance to a topic and a relationship over time between similar videos within a corpus of videos.

12. The method as recited in claim 11, wherein creating equivalence classes includes creating classes of near-duplicate keyframes with indices based upon similarities between the near-duplicate keyframes.

13. The method as recited in claim 12, wherein a popularity of the classes is determined and rendered using a false-color scheme.

14. The method as recited in claim 11, further comprising determining a similarity between two videos by aligning and comparing respective near-duplicate keyframe sequences.

15. The method as recited in claim 11, wherein rendering the near-duplicate keyframes in a graphical representation includes generating a graph to temporally show a history of one or more near-duplicate keyframes.

16. The method as recited in claim 11, wherein rendering the near-duplicate keyframes in a graphical representation includes generating a graph to show inheritance features of one or more near-duplicate keyframes.

17. The method as recited in claim 11, wherein the relationships between video content include one or more of: non-relevant videos from those returned by a search engine; videos whose parts have been incorporated into other videos; summary videos within a corpus of videos; and mashup videos within a corpus of videos.

18. The method as recited in claim 11, wherein the equivalence class indices include one of integers, colors, and descriptors with indices being grouped into one or more classes of near-duplicate keyframes, and classes of near-duplicate keyframes being represented by index values.

19. The method as recited in claim 11, wherein rendering the near-duplicate keyframes in a graphical representation includes determining a genre of a video based upon a visual rendering of the sequence of near-duplicate keyframes.

20. The method as recited in claim 19, wherein the genre includes one or more of: news videos, videos collecting images from other videos, monologue videos or videos with a single image, talkshow videos and slideshow videos.

* * * * *